United States Patent [19]

Tanaka

[11] 3,832,484

[45] Aug. 27, 1974

[54] METHOD AND MEANS FOR REPRODUCING A MIRROR-IMAGE RECORD OF A SUBJECT COPY IN A FACSIMILE MASTER-MAKING MACHINE

[75] Inventor: Akira Tanaka, Fujisawa, Japan

[73] Assignee: Gakken Co., Ltd., Tokyo, Japan

[22] Filed: Nov. 17, 1972

[21] Appl. No.: 307,565

[30] Foreign Application Priority Data

Nov. 20, 1971 Japan .............................. 46-93353
Mar. 23, 1972 Japan .............................. 47-29236

[52] U.S. Cl. ................ 178/6.6 B, 178/7.6, 355/48, 355/49

[51] Int. Cl. ........................ G03b 27/10, H04n 1/14

[58] Field of Search ....... 355/49, 48, 47; 178/6.6 R, 178/6.6 B, 6.7 R, 7.6; 179/100.2 E

[56] References Cited

UNITED STATES PATENTS 3,130,631 4/1964 Murata .............................. 355/48
3,290,988 12/1966 Murata .............................. 355/49
3,652,808 3/1972 Esterly .............................. 179/100.2 E

*Primary Examiner*—Howard W. Britton
*Attorney, Agent, or Firm*—Irving M. Weiner

[57] ABSTRACT

A scanning head and a recording head supported against a subject copy and a record medium wrapped side-by-side around a single rotary drum in relationship are caused to move synchronously in opposite directions, either away from or toward each other, parallel to the axis of the rotary drum in relation with the rotation thereof. A record of the subject copy thus reproduced on the record medium is reversed as to its left and right, so that the record medium can be used as a master in lithographic and other printing processes.

15 Claims, 12 Drawing Figures

METHOD AND MEANS FOR REPRODUCING A MIRROR-IMAGE RECORD OF A SUBJECT COPY IN A FACSIMILE MASTER-MAKING MACHINE

This invention relates generally to a machine in which a facsimile transmitter and receiver are integrally combined to reproduce a subject copy in a form usable as a master in some printing processes. More specifically, the invention is directed to methods and means for producing, by such a facsimile master making machine, a record which is exactly in mirror-image relationship with the subject copy, that is, reversed as to its left and right.

BACKGROUND OF THE INVENTION

Heretofore, there is known a stencil-making machine based on the principles of facsimile, in which a subject copy and stencil paper are wrapped side-by-side around a single rotary drum. As this drum is rotated at a constant speed, a scanning head and a recording head supported in corresponding positions against the subject copy and the record medium, respectively, are moved synchronously in the same direction parallel to the axis of the drum. The scanning head, comprising an optical system and a photoelectric cell, scans the subject copy and converts the information into electrical signals which are sent to the recording head, where electrical discharge takes place through its usually tungsten-made recording stylus to the paraffin or like material impregnated in or coated on the stencil paper, thereby leaving a porous record of the subject copy thereon. A number of copies can be reproduced from this stencil paper by means of mimeograph.

Since, however, the record of the subject copy reproduced in this manner is unreversed as to left and right, the prior art machine can be used only for the production of stencils. In some printing processes in which copies are produced by direct contact with the inked surfaces, the lettering or design on these surfaces must be in mirror-image relationship with the copies. Further, in other printing processes, a negative intermediary film, known as "lith film" to those in the art, is required for the preparation of a positive printing master. Conventionally, the negative lith film has been prepared by photographic means only.

SUMMARY OF THE INVENTION

The present invention provides an apparatus for producing a record which is in mirror-image relationship with a subject copy, and includes rotatable means for holding the subject copy and a record medium. The apparatus also includes first drive means for imparting rotary movement to the rotatable means. There is also provided scanning means, and recording means. The apparatus also includes second drive means for causing the scanning means and the recording means to move synchronously in opposite dierections parallel to the axis of rotation of the rotatable means, whereby the scanning means successively scans elemental areas of the subject copy and translates information derived from such elemental areas into corresponding electrical signals while the recording means reproduces a mirror-image record of the subject copy on the record medium in accordance with the electrical signals supplied from the scanning means.

It is, therefore, an object of the present invention to provide methods and means for reproducing a mirror-image record of a subject copy on a record medium in a master-making machine based on the principles of facsimile, such that the record medium can be used directly, or indirectly, as a master in some printing processes other than stenciling.

Another object of the invention is to provide a method of reproducing a mirror-image record of a subject copy in which a scanning head and a recording head supported against the subject copy and a record medium, respectively, which are wrapped around a single rotary drum of a facsimile master making machine in side-by-side relationship are caused to move synchronously in opposite directions, either away from or toward each other, parallel to the axis of the rotary drum in relation with the rotation thereof. Alternatively, the scanning head and the recording head may be moved synchronously in opposite directions along the subject copy and the record medium, respectively, which are wrapped around a separate transmitting drum and a receiving drum while these drums are being rotated in exact synchronism.

A further object of the invention is to provide means for moving the scanning head and the recording head relative to the rotary drum of a facsimile master making machine around which are wrapped a subject copy and a record medium in side-by-side relationship, in such a manner that a mirror-image record of the subject copy is reproduced on the record medium. The means may comprise an endless belt extending parallel to the rotary drum, to the two parallel stretches of which are respectively coupled the scanning head and the recording head, and a power train for imparting the rotation of the rotary drum on one of the terminal pulleys of the endless belt at a reduced speed whereby the scanning head and the recording head are moved synchronously in opposite directions in relation with the rotation of the rotary drum. The means may further include manual return means for manually returning the scanning head and the recording head to their respective starting positions by disengaging the said one of the terminal pulleys from the power train.

DESCRIPTION OF THE PREFERRED EMBODIMENTS

Figure 1:
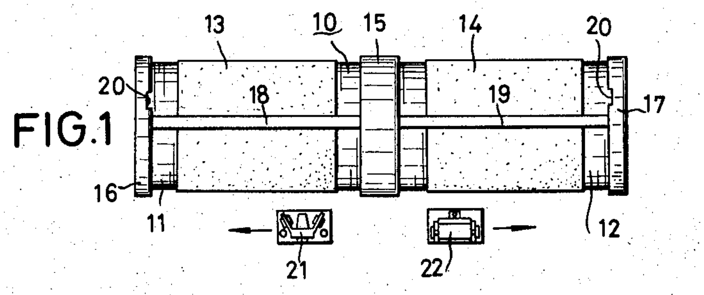
FIGS. 1 to 3 are schematic top plan views explanatory of the principles of the present invention.
Figure 2:
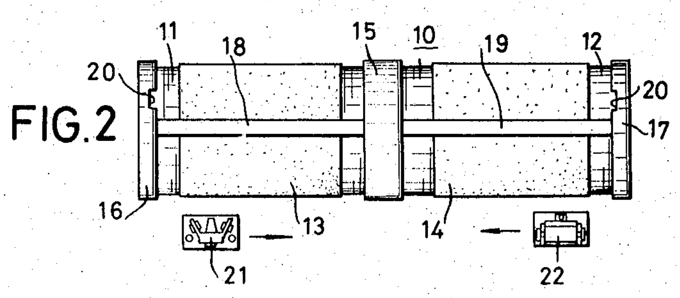
Figure 3:
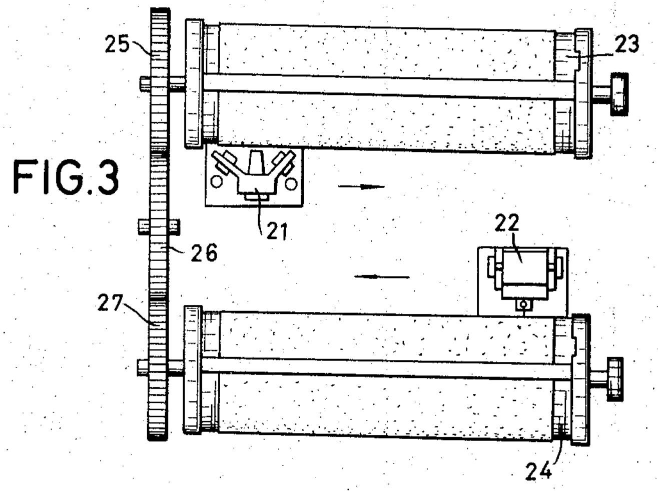

The principles from which are derived the methods and means of this invention will be apparent from FIGS. 1 to 3. With particular reference to FIG. 1, rotatable means, such as a rotary drum 10, is rotated in a predetermined direction at a constant speed by means conventionally employed in facsimile master making machines. The circumference of the rotary drum 10 is bisected into a transmitting section 11, shown on its lefthand side as viewed in FIG. 1, and a receiving section 12 on its right-hand side. A subject copy 13 to be reproduced according to the concepts of the invention is wrapped around the transmitting section 11, whereas a record medium 14 of a suitable type is wrapped around the receiving section 12.

A holder ring 15 is provided centrally of the rotary drum 10, and an additional pair of holder rings are provided at 16 and 17 so as to be rotatable relative to the rotary drum. Elongated holder plates 18 and 19 extend between the holder rings 16 and 15 and between the holder rings 15 and 17, respectively, to hold in position the both ends of each of the subject copy 13 and the record medium 14 wrapped around the rotary drum 10. For removal of the subject copy and record medium, the holder rings 16 and 17 may be turned relative to the rotary drum 10 to adjust the outer ends of the holder plates 18 and 19 to recesses 20 formed in the inner edges of the holder rings 16 and 17, thereby releasing the holder plates 18 and 19 from the holder rings 16 and 17, respectively.

Scanning means, such as a scanning head 21, and recording means, such as a recording head 22, are supported opposite the subject copy 13 and the record medium 14, respectively, that are wrapped around the transmitting section 11 and the receiving section 12 of the rotary drum 10. The scanning head 21 comprises an optical system composed of a light source, a lens and an aperture, for scanning the successive elemental areas of the subject copy 13, and a photoelectric cell for translating the varying amounts of reflected light into corresponding signal amplitudes, in accordance with the prior art. The recording head 22 includes a recording stylus electrically associated with the scanning head 21 to reproduce a mirror-image likeness of the subject copy in a manner hereinafter described.

For their scanning and recording operations, the scanning head 21 and the recording head 22 move in a precisely synchronized manner from their innermost positions shown in FIG. 1 outwardly while paralleling the axis of the rotary drum 10, as indicated by the arrows in the drawing. Hence, as the drum 10 is rotated at a constant speed, the scanning head 21, moving linearly from its innermost starting position, dissects the subject copy 13 into a number of small elemental areas which are scanned one at a time. The recording head 22, now traveling in the opposite direction in exact synchronism with the scanning head 21, progressively reproduces a likeness of the subject copy, one elemental area at a time, on the record medium 14 in accordance with the electrical impulses supplied from the scanning head 21. Since the scanning head and the recording head are caused to move in opposite directions alongside the rotary drum 10, the image of the subject copy recorded on the record medium 14 is reversed as to its left and right.

A modification of the principles of FIG. 1 is shown in FIG. 2 in which the scanning head 21 and the recording head 22 are caused to travel inwardly from their outermost positions opposite the subject copy 13 and the record medium 14, respectively, in exact synchronism with each other. In this manner, too, a mirror-image likeness of the subject copy 13 is reproduced on the record medium 14. The details for this process of reproduction are the same as those set forth with relation to FIG. 1, except for the difference in the directions of movement of the scanning head and the recording head relative to the rotary drum.

FIG. 3 illustrates a further modified example of the principles of the invention, in which the transmitting section 11 and the receiving section 12 of the rotary drum shown in FIGS. 1 and 2 are physically divided into a transmitting drum 23 and a receiving drum 24 which are arranged parallel to each other. The drums 23 and 24 are rotated in the same direction and at the same speed by first drive means, including a train of gears 25, 26 and 27. The scanning head 21 and the recording head 22, shown in their starting positions opposite the drums 23 and 24 respectively, are to be moved synchronously in the opposite directions as indicated by the arrows in the drawing, whereby a mirror-image likeness of the subject copy on the transmitting drum 13 can be recorded on the record medium on the receiving drum 24 as in the examples of FIGS. 1 and 2.

Figure 11:
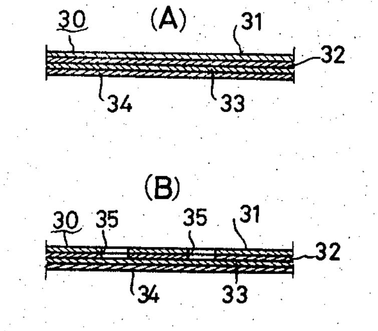
FIGS. 11(A) and (B) are sectional views showing an example of record medium for use with the machine of FIG. 4.
Figure 12:
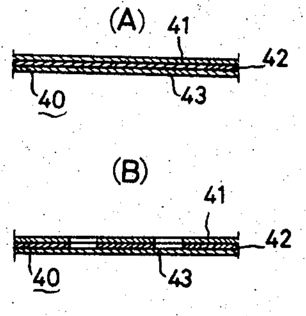
FIGS. 12(A) and (B) are sectional views showing another example of record medium for use with the machine of FIG. 4.

Reference is now directed to FIGS. 11 and 12 in order to describe two possible record media suitable for use with the methods and means of this invention for the preparation of masters in some printing processes other than stenciling. The record medium 30 shown in FIG. 11 is composed of an uppermost layer 31 of electrically semiconductive material which may be from white to grey in color, a second layer 32 of carbon, a third layer 33 of carbon which is rendered miscible with oil, and a lowermost base or backing 34 of paper, film or other suitable material.

This record medium 30 is wrapped for use around the receiving section 12 of the rotary drum 10, FIGS. 1 and 2, or around the receiving drum 24, FIG. 3, and the subject copy is reproduced thereon by disruptive discharge of electrical energy from the tungsten-made stylus of the recording head 22. The first semiconductive layer 31 and the second carbon layer 32 become ruptured, as indicated by the numeral 35 in FIG. 11(B), exposing the third layer 33 of carbon rendered miscible with oil in the mirror-image likeness of the subject copy. The printing ink for use with the master thus prepared must be such that it will be retained only by the exposed oil-miscible carbon of the third layer 33 while being repelled by the uppermost semiconductive layer 31. The record medium 30 and the printing ink which meets these requirements are now both easily available commercially.

The other record medium 40 shown in FIG. 12 is the aforesaid lith film, composed of an uppermost layer 41 of zinc oxide, an intermediate layer 42 of aluminum-base alloy, and a lowermost layer 43 of transparent polyester film. In use, the recording stylus is placed in direct contact with the record medium 40 wrapped around the receiving section 12 of the rotary drum 10 or around the receiving drum 24. A mirror-image likeness of the subject copy is reproduced on this record medium 40 as its zinc oxide and aluminum-base alloy layers 41 and 42 are removed, as shown in FIG. 12(B), by the pressure of the recording stylus and by the electric current delivered therefrom in accordance with the signal amplitudes transmitted from the scanning head 21.

Figures 4, 5:
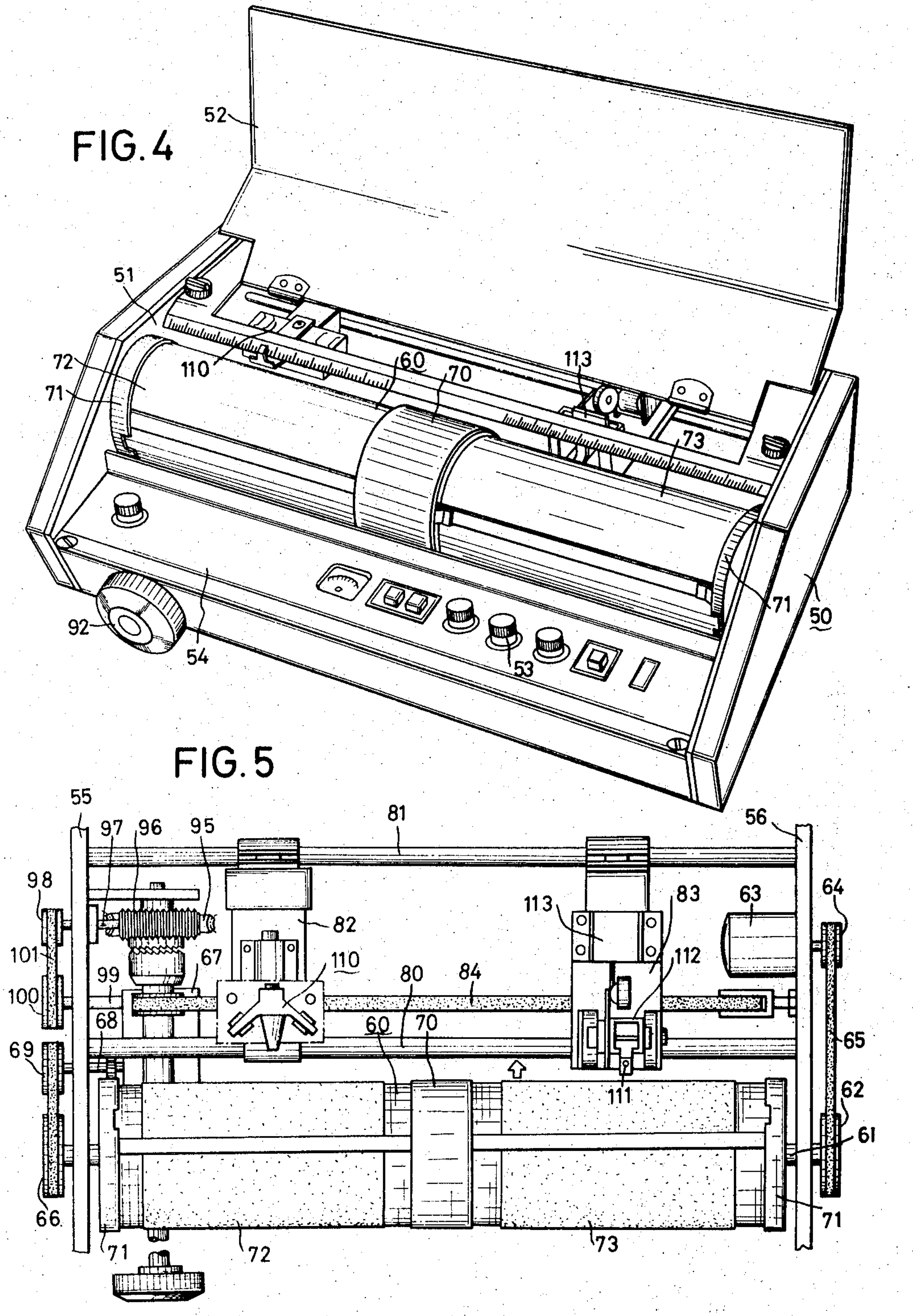
FIG. 4 is a perspective view of a facsimile master making machine incorporating the principles of the invention.
FIG. 5 is a top plan view showing means for synchronously moving a scanning head and a recording head in opposite directions parallel to the axis of a rotary drum in the facsimile master making machine of FIG. 4.

FIG. 4 illustrates a facsimile master making machine incorporating the principles of FIGS. 1 and 2. The casing 50 of the master making machine is opened at 51 and has a hinged lid or cover 52 of plastic or like material capable of closing over the opening 51 and a front panel 54 on which are arranged several switches 53 and other controls of the machine.

As best shown in FIG. 5, a rotary drum 60 is fixedly mounted on a shaft 61 extending horizontally between a pair of side plates 55 and 56 within the casing 50. A pulley 62 mounted on one end of the shaft 61 projecting through the side plate 56 is linked by means of an endless belt 65 to a drive pulley 64 mounted on the output shaft of a motor 63, so that the drum 60 can be rotated at a constant speed by this motor 63. Another pulley 66 is mounted on the other end of the shaft 61 projecting through the side plate 55 and is linked by means of an endless belt to a pulley 69 mounted on an input shaft 68 of a gearbox 67 adapted for reducing the speed of rotation of the shaft 61.

Like the rotary drum 10 illustrated in FIGS. 1 and 2, the drum 60 is provided with a holder ring 70 centrally of its circumference and with an additional pair of holder rings 71 on both ends thereof. The left-hand side, as seen in FIGS. 4 and 5, of the holder ring 70 defines a transmitting section 72 around which is to be wrapped a subject copy not shown in the drawings, whereas the right-hand side of the holder ring 70 defines a receiving section 73 around which is to be wrapped a record medium which may be selected from the record media shown in FIGS. 11 and 12.

Figure 6:
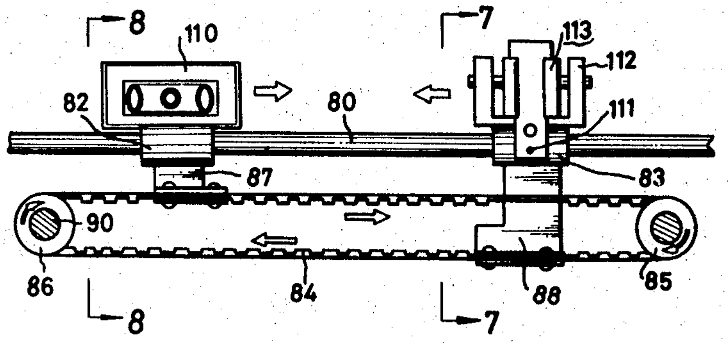
FIG. 6 is a side elevational view looking in the direction of the arrow in FIG. 5 to show an endless belt operating over a pair of terminal pulleys to move the scanning head and the recording head in opposite directions in the machine of FIG. 4.
Figure 7:
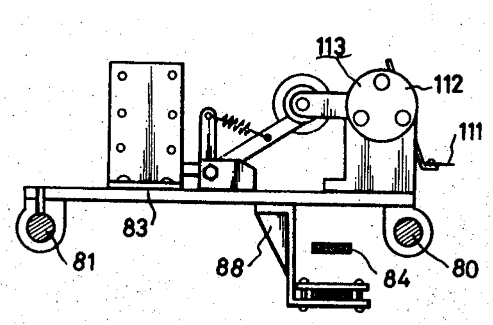
FIG. 7 is a view taken along the plane of line 7—7 in FIG. 6.
Figure 8:
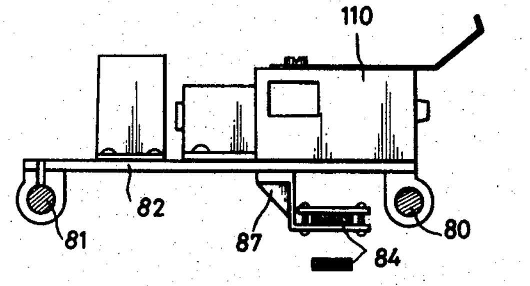
FIG. 8 is a view taken along the plane of line 8—8 in FIG. 6.

Behind of the rotary drum 60, a pair of parallel guide rods 80 and 81 extend between the aforesaid side plates 55 and 56. Slidably mounted on this pair of guide rods 80 and 81 are carriages 82 and 83 on which are supported a scanning head 110 and a recording head 113 respectively. Below the rotary drum 60, an endless belt 84 extends between an idler pulley 85 and a drive pulley 86, as seen in FIG. 6. It may be noted that the spacing between the pulleys 85 and 86 is approximately equal to the axial length of the rotary drum 60. The carriages 82 and 83 are coupled to the upper and lower stretches, respectively, of the endless belt 84 by coupling means 87 and 88 extending downwardly therefrom, as illustrated in greater detail in FIGS. 7 and 8.

Figure 9:
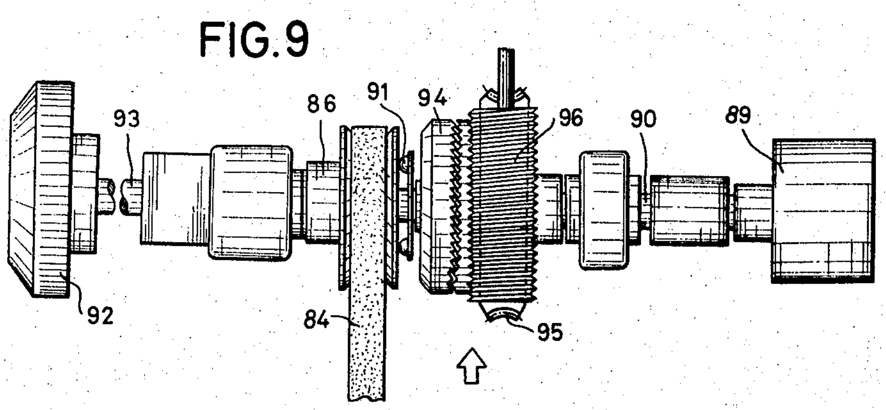
FIG. 9 is an enlarged top plan view showing manual return means for manually returning the scanning head and the recording head to their respective starting positions in the machine of FIG. 4.
Figure 10:
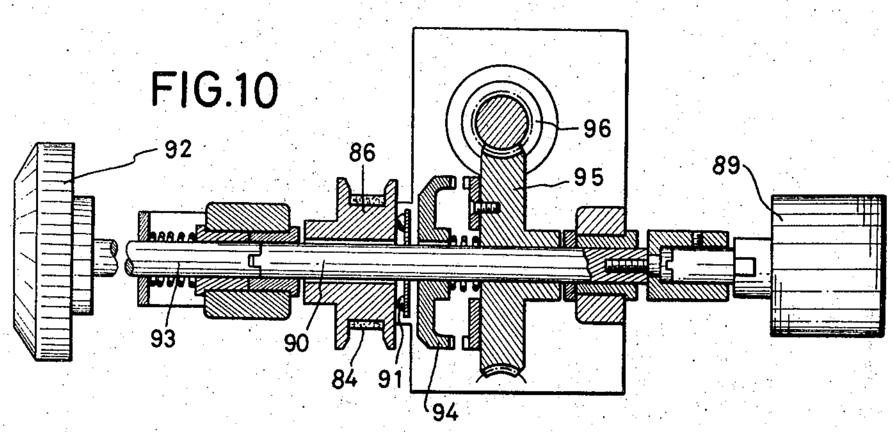
FIG. 10 is an axial sectional view, partly in side elevation, of the means shown in FIG. 9.

With particular reference to FIGS. 9 and 10, the drive pulley 86 is mounted on a shaft 90 so as to be slidable axially thereof and yet capable of power transmission therefrom, the shaft 90 being axially movable by means of a solenoid 89. The drive pulley 86 is normally retained in its operative position by stop means 91. The shaft 90 is releasably engaged with a second shaft 93 which is coupled to a knob 92 on the front face of the casing 50, as seen also in FIG. 4. A clutch member 94 is fixedly mounted on the first mentioned shaft 90 in opposition to a worm wheel 95 loosely mounted thereon. Upon actuation of the solenoid 89, the first shaft 90 will be moved axially backwardly out of engagement with the second shaft 93 thereby causing the clutch member 94 to engage the worm wheel 95 which is made incapable of backward displacement relative to the first shaft 90. The rotation of the worm wheel 95 is now transmitted to the first shaft 90 through the clutch member 94. The drive pulley 86 is retained in position by the stationary stop means 91 in spite of the backward movement of the first shaft 90.

When the solenoid 89 is de-energized, on the other hand, the first shaft 90 will be moved axially forwardly into engagement with the second shaft 93 by means of a helical compression spring interposed between the clutch member 94 and the worm wheel 95. The clutch member 94 thus moves out of engagement with the worm wheel 95. Now, by manually turning the knob 92 to rotate the drive pulley 86 through the shafts 93 and 90, the positions of the scanning head 110 and the recording head 113 relative to the transmitting section 72 and the receiving section 73 of the rotary drum 60 can be re-adjusted interrelatedly.

Referring back to FIG. 5, the worm wheel 95 of FIGS. 9 and 10 meshes with a worm 96 having its shaft 97 extending through the side plate 55. A pulley 98 mounted on the projecting end of the shaft 97 is linked by an endless belt 101 to a pulley 100 mounted on an output shaft 99 of the gearbox 67. Thus, the rotation of the drum 60, caused by the motor 63, is translated into the linear motion of the scanning head 110 and the recording head 113 in the opposite directions parallel to the rotary drum 60.

The scanning head 110 comprises an optical system for successively scanning the elemental areas of the subject copy wrapped around the transmitting section 72, and a photoelectric cell for translating the varying amounts of reflected light into corresponding signal amplitudes. The recording head 113 includes a stylus 111 supported by a holder 112 for reproducing a likeness of the subject copy in accordance with the signal amplitudes transmitted from the scanning head 110, on the record medium which may be selected from the examples shown in FIGS. 11 and 12.

Proceeding to the description of operation of a preferred embodiment of the invention described hereinbefore with reference to FIGS. 4 to 10, the scanning head 110 and recording head 113 become operative when the master making machine of FIG. 4 is set in operation by the switches 53 on its front panel 54. The rotation of the drum 60, caused by the motor 63, further causes the worm 96 to rotate at a reduced speed through the pulleys 66 and 69, the gearbox 67 and the pulleys 100 and 98. Since the solenoid 89, FIGS. 9 and 10, is assumed to be actuated simultaneously when the master making machine is set in operation, the clutch member 94 is now engaged with the worm wheel 95 to convey its rotation to the drive pulley 86 through the shaft 90.

As the endless belt 84 is moved by the drive pulley 86 in the direction arrow marked by way of example in FIG. 6, the carriages 82 and 83 coupled to the upper and lower stretches, respectively, of the endless belt 84 are moved inwardly from their outermost starting positions while paralleling the axis of the rotary drum 60. This synchronized linear motion of the scanning head 110 and the recording head 113, taking place in the opposite directions, combined with the rotary motion of the drum 60, enables the subject copy wrapped around the transmitting section 72 to be reproduced in mirror-image relationship on the record medium wrapped around the receiving section 73, through the procedure set forth above. When the scanning head and the recording head reach their predetermined innermost positions, a microswitch (not shown) or the like may be caused to operate automatically to stop the operation of the master making machine.

Since the motion of the endless belt 84 is made extremely slow for the proper scanning and recording of the subject copy, and since it is desirable that the scanning head and the recording head be quickly returned to their initial positions upon completion of the reproduction of the subject copy, the solenoid 89 is caused to become de-energized immediately when the heads 110 and 113 arrive at their predetermined innermost positions. The clutch member 94 being then disengaged from the worm wheel 95, thereby causing the first shaft 90 to engage the second shaft 93, the knob 92 may be turned manually to rotate the drive pulley 86 through the shafts 93 and 90. Thus, the scanning head and the recording head coupled to the upper and lower stretches, respectively, of the endless belt 84 extending over the drive pulley 86 can be moved away from each other to their outermost starting positions relative to the drum 60.

The embodiment shown and described hereinbefore is based on the principles of the invention illustrated in FIG. 2. It will be apparent, however, that the principles of FIG. 1 are easily adaptable by changing the starting positions of the scanning head 110 and the recording head 113 as in FIG. 1 and by causing the drive pulley 86 to rotate in the opposite direction. Moreover, the combination of the endless belt 84 and the terminal pulleys 86 and 85 adapted for moving the scanning head and the recording head in the opposite directions may be easily replaceable by an endless chain operating over a pair of terminal sprocket wheels, without departing from the principles of the invention.

Furthermore, it will be apparent to those skilled in the art to devise many other modifications of the embodiments disclosed herein. For example, instead of the belt-and-pulley mechanism of the illustrated embodiment, there may be provided parallel to the rotary drum 60 a rod having right- and left-hand screw threads formed at the same pitch on the equally divided halves of its circumference, and the carriages 82 and 83 having internal screw threads formed correspondingly therethrough may be mounted on the right- and left-hand screw threaded portions, respectively, of this rod. By rotating the rod with a suitable drive mechanism associated with the rotation of the drum 60, the scanning head and the recording head mounted on the respective carriages 82 and 83 will be moved synchronously in opposite directions along the drum 60.

It is, therefore, appropriate that the appended claims be construed broadly and in a manner consistent with the principles of the invention set forth herein.

I claim:

1. An apparatus for producing a record which is in mirror-image relationship with a subject copy, comprising, in combination:

rotatable means for holding said subject copy and a record member;

first drive means for imparting rotary movement to said rotatable means;

scanning means;

recording means; and second drive means for causing said scanning means and said recording means to move synchronously in opposite directions parallel to the axis of rotation of said rotatable means, whereby said scanning means successively scans elemental areas of said subject copy and translates information derived from said elemental areas into corresponding electrical signals while said recording means reproduces a mirror-image record of said subject copy on said record medium in accordance with the electrical signals supplied from said scanning means.

2. An apparatus according to claim 1 for use as a facsimile master making machine, wherein:

said scanning means includes a scanning head;

said recording means includes a recording head;

said rotatable means includes a rotary drum having a transmitting section and a receiving section each on one side of the middle of its axial length;

said second drive means moves said scanning head and said recording head relative to said rotary drum in such a manner that said subject copy wrapped around said transmitting section is reproduced in mirror-image relationship on said record medium wrapped around said receiving section;

said first drive means imparts rotation to said rotary drum;

and including support means for supporting said scanning head and said recording head against said subject copy and said record medium, respectively, so as to be movable parallel to the axis of said rotary drum; and said second drive means causes said scanning head and said recording head to move synchronously in opposite directions parallel to the axis of rotation of said rotary drum whereby said scanning head successively scans elemental areas of said subject copy and translates information derived from said elemental areas into corresponding electrical signals while said recording head reproduces a mirror-image record of said subject copy on said record medium in accordance with the electrical signals supplied from said scanning head.

3. An apparatus according to claim 2, wherein said scanning head and said recording head are caused by said second drive means to move synchronously away from each other parallel to the axis of rotation of of said rotary drum.

4. An apparatus according to claim 2, wherein said scanning head and said recording head are caused by said second drive means to move synchronously toward each other parallel to the axis of rotation of said rotary drum.

5. An apparatus according to claim 2, wherein:

said second drive means comprises an endless moving member operating over a pair of terminal rotors and extending parallel to the axis of said rotary drum; and including means for separately connecting said scanning head and said recording head to two parallel stretches of said endless moving member extending between said pair of terminal rotors, whereby, as one of said terminal rotors is rotated in relation with the rotation of said rotary drum, said scanning head and said recording head are moved by said endless moving member synchronously in opposite directions parallel to the axis of said rotary drum.

6. An apparatus according to claim 5, wherein said endless moving member is an endless belt operating over a pair of terminal pulleys.

7. An apparatus according to claim 5, wherein said scanning head and said recording head are mounted on respective carriages slidably supported by a pair of guide rods extending parallel to the axis of said rotary drum, said carriages being separately connected to said two parallel stretches of said endless moving member.

8. An apparatus according to claim 5, wherein said second drive means includes a power train for transmitting the rotation of said rotary drum to said one of said terminal rotors at a reduced speed.

9. An apparatus according to claim 8, including manual return means for manually returning said scanning head and said recording head to their initial positions by manually turning said one of said terminal rotors after disengaging same from said power train.

10. An apparatus according to claim 9, wherein said manual return means comprises a first shaft capable of both rotary and axial motion, said one of said terminal rotors being mounted on said first shaft so as to be capable of rotation therewith and also of moving axially thereof, stop means for normally holding said one of said terminal rotors in its operative position, clutch means fixedly mounted on said first shaft, means for moving said first shaft axially between a first position where said clutch means is engaged with a toothed wheel loosely mounted on said first shaft to convey the rotation thereof to said one of said terminal rotors and a second position where said clutch means is disengaged therefrom, said toothed wheel being the final element of said power train, and a second shaft having a manually turnable member formed on one end thereof, the other end of said second shaft being engageable with one end of said first shaft when the latter is moved to said second position thereof.

11. A method of using an apparatus for producing a record which is in mirror-image relationship with a subject copy, wherein said apparatus includes rotatable means for holding said subject copy and a record member and including a rotary drum having a transmitting section and a receiving section each on one side of the middle of its axial length, first drive means for imparting rotation to said rotary drum, scanning means including a scanning head, recording means including a recording head, second drive means for moving said scanning head and said recording head relative to said rotary drum in such a manner that said subject copy wrapped around said transmitting section is reproduced in mirror-image relationship on a record medium wrapped around said receiving section, and support means for supporting said scanning head and said recording head against said subject copy and said record medium, respectively, so as to be movable parallel to the axis of said rotary drum, said method using such apparatus for reproducing said record of said subject copy wrapped around said transmitting section on said record medium wrapped around said receiving section, comprising the steps of:

disposing said scanning head and said recording head in positions against said subject copy and said record medium, respectively, and symmetrically opposed to each other with respect to the intervening axis passing through said middle of the axial length of said rotary drum; and causing said scanning head and said recording head to move synchronously in opposite directions parallel to the axis of rotation of said rotary drum in relation with the rotarion thereof, whereby said scanning head successively scans the elemental areas of said subject copy and converts the information derived from said areas into corresponding electrical signals while said recording head reproduces the mirror-image record of said subject copy on said record medium in accordance with the electrical signals supplied from said scanning head.

12. A method according to claim 11, wherein said scanning head and said recording head are first disposed in innermost positions with respect to said subject copy and said record medium, respectively, and are caused to move synchronously away from each other parallel to the axis of said rotary drum in relation with the rotation thereof.

13. A method according to claim 11, wherein said scanning head and said recording head are first disposed in outermost positions with respect to said subject copy and said record medium, respectively, and are caused to move synchronously toward each other parallel to the axis of said rotary drum in relation with the rotation thereof.

14. A method of using an apparatus for producing a record which is in mirror-image relationship with a subject copy, such apparatus including rotatable means for holding said subject copy and a record medium, first drive means for imparting rotary movement to said rotatable means, scanning means, recording means, and second drive means for causing said scanning means and said recording means to move synchronously in opposite directions parallel to the axis of rotation of said rotatable means, and wherein said scanning means includes a scanning head, said recording means includes a recording head, and said rotatable means includes a transmitting drum and a receiving drum which are rotated synchronously, said method for reproducing said record of said subject copy wrapped around said transmitting drum on said record medium wrapped around said receiving drum, said method comprising the steps of:

disposing said scanning head and said recording head against said subject copy and said record medium, respectively, and adjacent the opposite ends of said transmitting drum and said receiving drum; and causing said scanning head and said recording head to move synchronously in opposite directions parallel to the axes of said transmitting drum and said receiving drum in relation with the synchronized rotation thereof, whereby said scanning head successively scans the elemental areas of said subject copy and translates information derived from said elemental areas into corresponding electrical signals while said recording head reproduces the mirror-image record of said subject copy on said record medium in accordance with said electrical signals supplied from said scanning head.

15. A method according to claim 14, wherein said transmitting drum and said receiving drum are disposed parallel to each other.

* * * * *